(12) United States Patent
Jeanneteau et al.

(10) Patent No.: US 10,584,708 B2
(45) Date of Patent: Mar. 10, 2020

(54) METHOD FOR CHECKING THE FUNCTIONS OF A PLURALITY OF FANS

(71) Applicant: Electrolux Appliances Aktiebolag, Stockholm (SE)

(72) Inventors: Laurent Jeanneteau, Forli (IT); Massimo Nostro, Forli (IT); Massimo Zangoli, Forli (IT); Alex Viroli, Forli (IT); Nicola Terracciano, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 258 days.

(21) Appl. No.: 15/534,224

(22) PCT Filed: Feb. 1, 2016

(86) PCT No.: PCT/EP2016/052024
§ 371 (c)(1),
(2) Date: Jun. 8, 2017

(87) PCT Pub. No.: WO2016/128236
PCT Pub. Date: Aug. 18, 2016

(65) Prior Publication Data
US 2018/0258942 A1    Sep. 13, 2018

(30) Foreign Application Priority Data
Feb. 11, 2015    (EP) .................................. 15154601

(51) Int. Cl.
*F04D 27/00*        (2006.01)
*F04D 25/16*        (2006.01)
(Continued)

(52) U.S. Cl.
CPC ......... *F04D 27/001* (2013.01); *F04D 25/166* (2013.01); *F04D 27/004* (2013.01);
(Continued)

(58) Field of Classification Search
None
See application file for complete search history.

(56) References Cited

U.S. PATENT DOCUMENTS 5,675,480 A * 10/1997 Stanford ............... H02M 3/285
307/58
6,386,969 B1    5/2002 O'Brien
(Continued)

FOREIGN PATENT DOCUMENTS

CN    2 793 626 Y    7/2006
CN    1959255 A    5/2007
(Continued)

OTHER PUBLICATIONS

International Search Report and Written Opinion from Corresponding Application No. PCT/EP2016/052024; dated Mar. 5, 2016.
(Continued)

*Primary Examiner* — Christopher Verdier
*Assistant Examiner* — Juan G Flores
(74) *Attorney, Agent, or Firm* — Pearne & Gordon LLP

(57) ABSTRACT

A method for checking functions of fans includes starting a normal operation mode, evaluating a fan monitoring signal depending on the fans' speeds, and starting a dynamic fan checking routine. If the monitoring signal is smaller than a lock threshold value, normal operation proceeds. If the monitoring signal is bigger than the lock threshold value, a multiple-fan checking routine is started. During each fan test the corresponding fan is activated for a predetermined time period, while the other fans are deactivated during the time period, and the monitoring signal is compared with the lock threshold value and a disconnecting threshold value. If the monitoring signal is bigger than the lock threshold value, the corresponding fan is locked and an error is detected. If the monitoring signal is smaller than the disconnecting thresh- (Continued)

Figure 1:
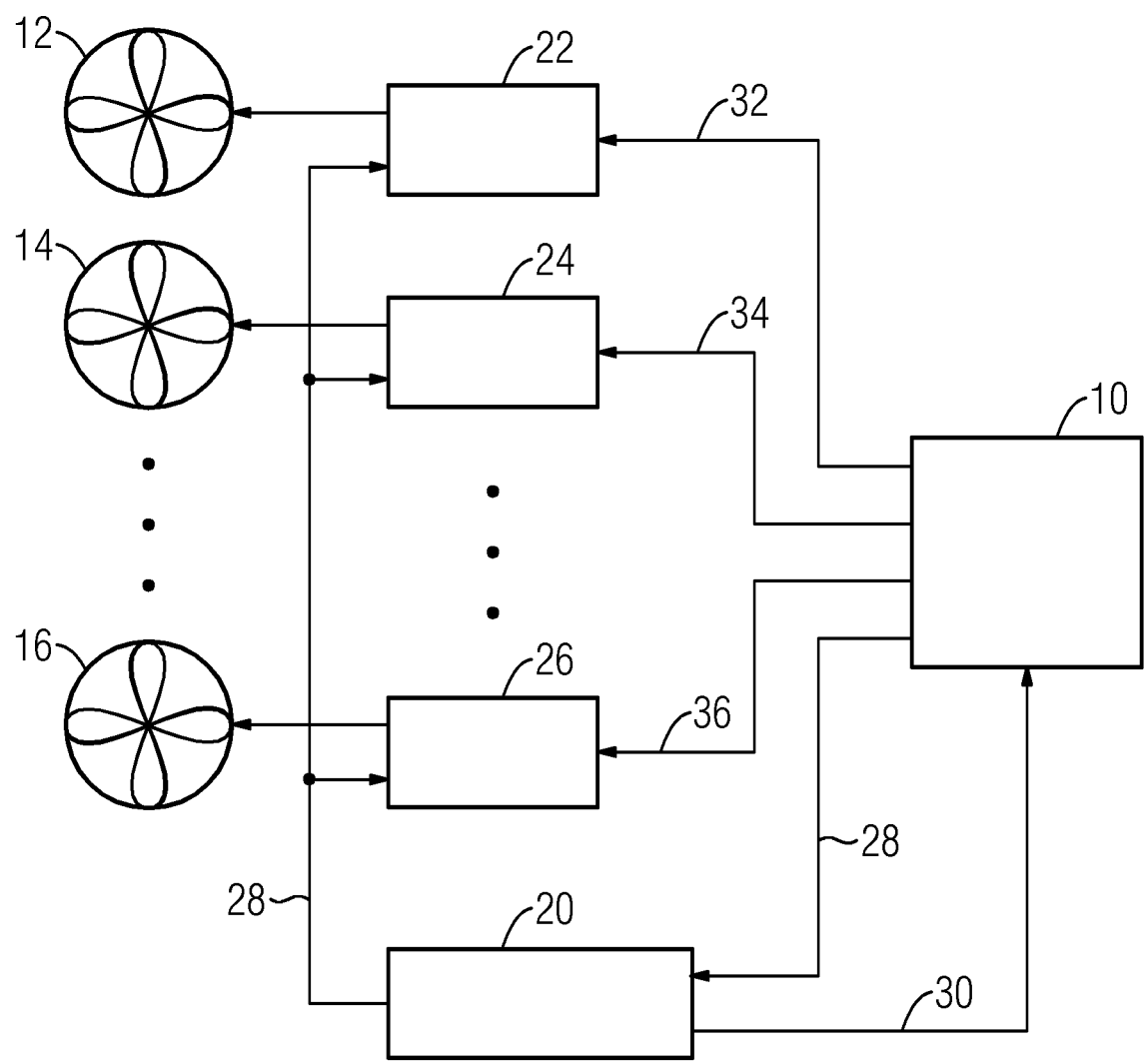

old value, the corresponding fan is disconnected and an error is detected.

15 Claims, 5 Drawing Sheets

(51) Int. Cl.
    *F24F 11/30*     (2018.01)
    *F24F 110/00*     (2018.01)
    *F24F 11/32*     (2018.01)

(52) U.S. Cl.
    CPC ............ *F04D 27/008* (2013.01); *F24F 11/30* (2018.01); *F24F 11/32* (2018.01); *F24F 2110/00* (2018.01)

(56) References Cited

U.S. PATENT DOCUMENTS

| | | | |
|---|---|---|---|
| 6,814,546 B2* | 11/2004 | Sekiguchi | F04D 27/004 318/111 |
| 8,704,470 B2* | 4/2014 | Shimizu | H02P 7/29 318/400.04 |
| 2004/0130868 A1* | 7/2004 | Schwartz | G06F 1/20 361/679.48 |
| 2006/0168975 A1 | 8/2006 | Malone et al. | |
| 2007/0081888 A1* | 4/2007 | Harrison | F04D 19/007 415/47 |
| 2011/0070098 A1 | 3/2011 | Horng et al. | |

FOREIGN PATENT DOCUMENTS

| | | |
|---|---|---|
| CN | 103939374 A | 7/2014 |
| CN | 104 135 838 A | 11/2014 |
| JP | 2001193687 A | 7/2001 |
| JP | 2004257668 A | 9/2004 |

OTHER PUBLICATIONS

English translation of Office action in corresponding Chinese Application 201680009533.3 dated Jun. 4, 2019, 7 pages.

* cited by examiner

METHOD FOR CHECKING THE FUNCTIONS OF A PLURALITY OF FANS

The present invention relates to a method for checking the functions of fans within an ensemble of a plurality of fans. Further, the present invention relates to an apparatus for controlling and detecting the functions of fans within an ensemble of a plurality of fans. Moreover, the present invention relates to a domestic appliance with an ensemble of a plurality of fans. Additionally, the present invention relates to a computer program stored in a computer usable medium, comprising computer readable program means for causing a computer to perform a method for checking the functions of fans within an ensemble of a plurality of fans.

Fans for cooling and venting purposes are used in different types of appliances. For example, a cooking hob, a cooking oven and a hood may comprise one or more fans. In some cases, safety standards require the detection of faults on the fans. In particular, a lock or disconnection of the fan may occur. It is desired that the detection of faults on the fans does not significantly disturb the operation of the fans.

It is an object of the present invention to provide a method for checking the functions of fans within an ensemble of a plurality of fans, wherein the time of deactivating the fans is minimized.

The object is achieved by the method according to claim 1.

According to the present invention the method for checking the functions of fans within an ensemble of a plurality of fans, said method comprises the following steps:
- starting a normal operation mode,
- detecting or evaluating a common fan monitoring signal depending on the speeds of the fans,
- starting a dynamic fan checking routine, in which the fan monitoring signal is compared with a lock threshold value,
- if the fan monitoring signal is smaller than the lock threshold value, then the dynamic fan checking routine is finished and the normal operation mode is set forth,
- if the fan monitoring signal is bigger than the lock threshold value, then the dynamic fan checking routine is finished and a multiple-fan checking routine is started, and
- consecutive fan tests corresponding with one single fan in each case are performed during the multiple-fan checking routine, wherein
- during each fan test the corresponding fan is activated for a predetermined time period, while the other fans are deactivated during said time period,
- during each fan test the fan monitoring signal is compared with the lock threshold value and a disconnecting threshold value,
- if the fan monitoring signal is bigger than the lock threshold value, then the corresponding fan is locked and an error is detected, and
- if the fan monitoring signal is smaller than the disconnecting threshold value, then the corresponding fan is disconnected and an error is detected.

The core of the present invention is the combination of the dynamic fan checking routine and the subsequent possible multiple-fan checking routine. If no locked fan is detected during the dynamic fan checking routine, then the multiple-fan checking routine is not necessary.

Preferably, the speed of each fan is controlled by a corresponding pulse-width modulation signal, while the fans are enabled and disabled by a common fan enabling signal.

For example, the predetermined time period for the fan test is between ten and twenty seconds, preferably thirteen seconds.

In particular, the fan monitoring signal bases on an analogue signal, preferably on a current signal amplitude of the fans, sampled and averaged by an analogue-digital converter system.

In this case, the samples of the analogue signal are taken during the last part of the predetermined time period of the fan test, in particular during the last third of the predetermined time period, preferably during the 9th to the 12th seconds of the time period of thirteen seconds.

For example, between 20 and 50 samples, preferably 30 samples, of the fan monitoring signal are taken within the last part of the predetermined time period of the fan test.

Further, the lock threshold value may be adapted or adaptable to the number of enabled and disabled fans during the dynamic fan checking routine.

Moreover, during the dynamic fan checking routine between 20 and 50 samples, preferably 30 samples, of the fan monitoring signal may be taken within a time period of between two seconds and five second, preferably three seconds.

Preferably, during the dynamic fan checking routine the speed of the fan is at its maximum value.

In contrast, during the fan test, the speed of the fan may be between 40% and 80% of its maximum value, preferably 60% of its maximum value.

In particular, the fan monitoring signal is represented by a binary coded number, preferably by an eight-bit number.

For example, the multiple-fan checking routine is periodically activated after a predetermined time interval once an error has been detected, wherein said time interval is between three and five minutes, preferably four minutes.

Alternatively, the multiple-fan checking routine is immediately activated, if an error has been detected.

Further, the present invention relates to an apparatus for controlling and detecting the functions of fans within an ensemble of a plurality of fans, wherein the apparatus is provided for a method mentioned above.

Additionally, the present invention relates to a domestic appliance with an ensemble of a plurality of fans, wherein the domestic appliance comprises the apparatus for controlling and detecting the functions of fans and/or the domestic appliance is provided for the method mentioned above.

At last, the present invention relates to a computer program stored in a computer usable medium, comprising computer readable program means for causing a computer to perform the method described above.

Novel and inventive features of the present invention are set forth in the appended claims.

Figure 2:
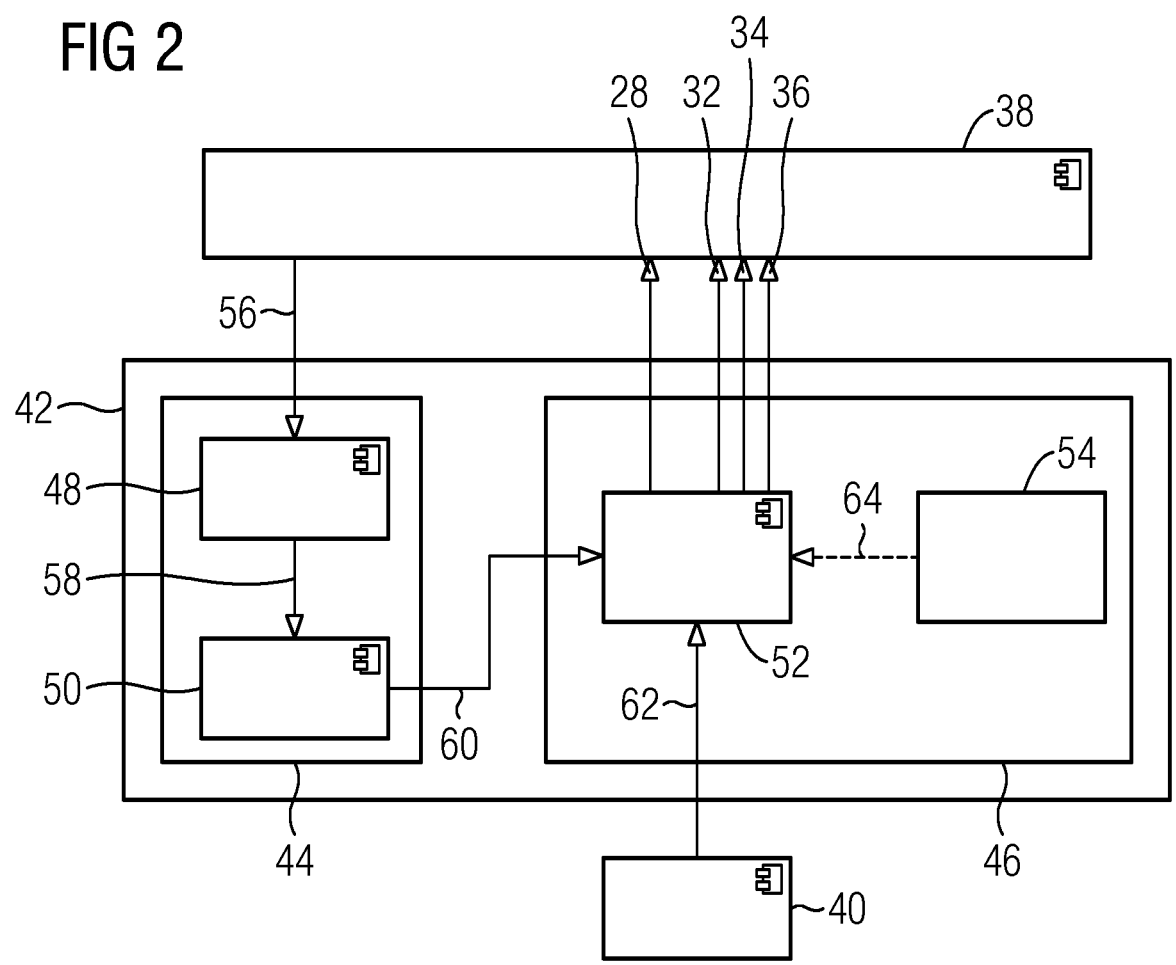
Figure 3:
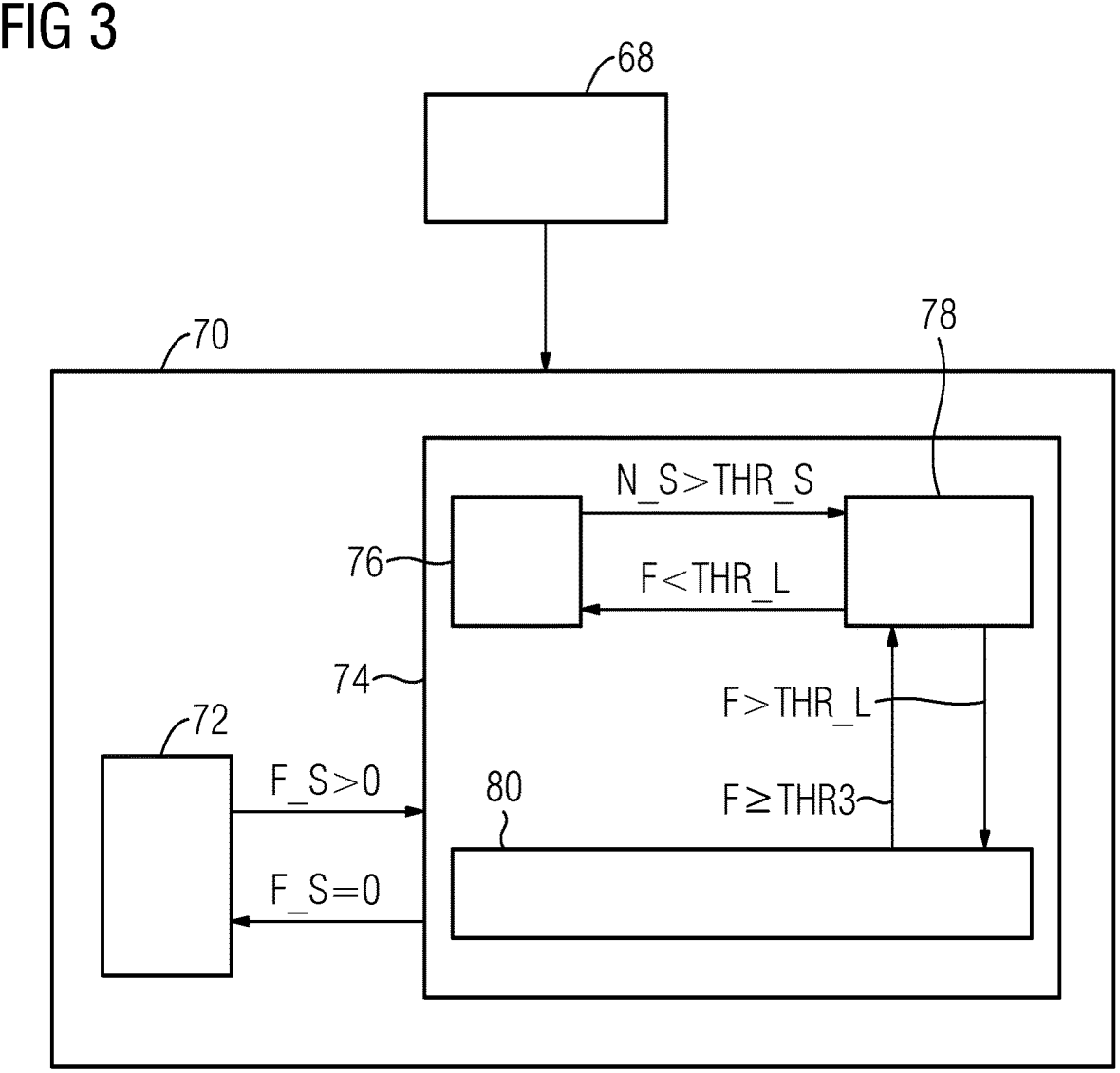
Figure 4:
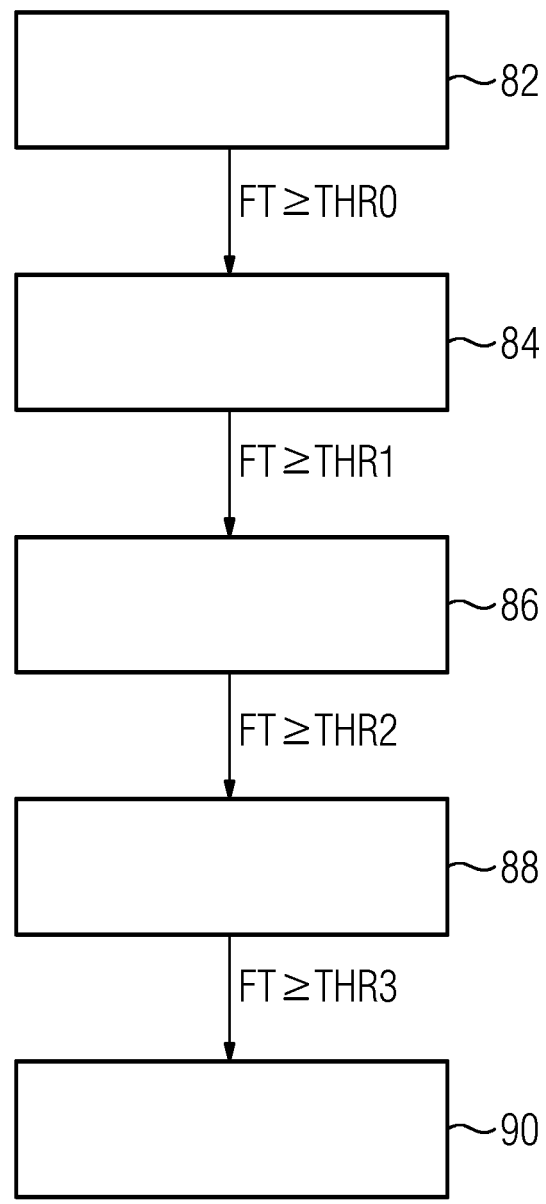
Figure 5:
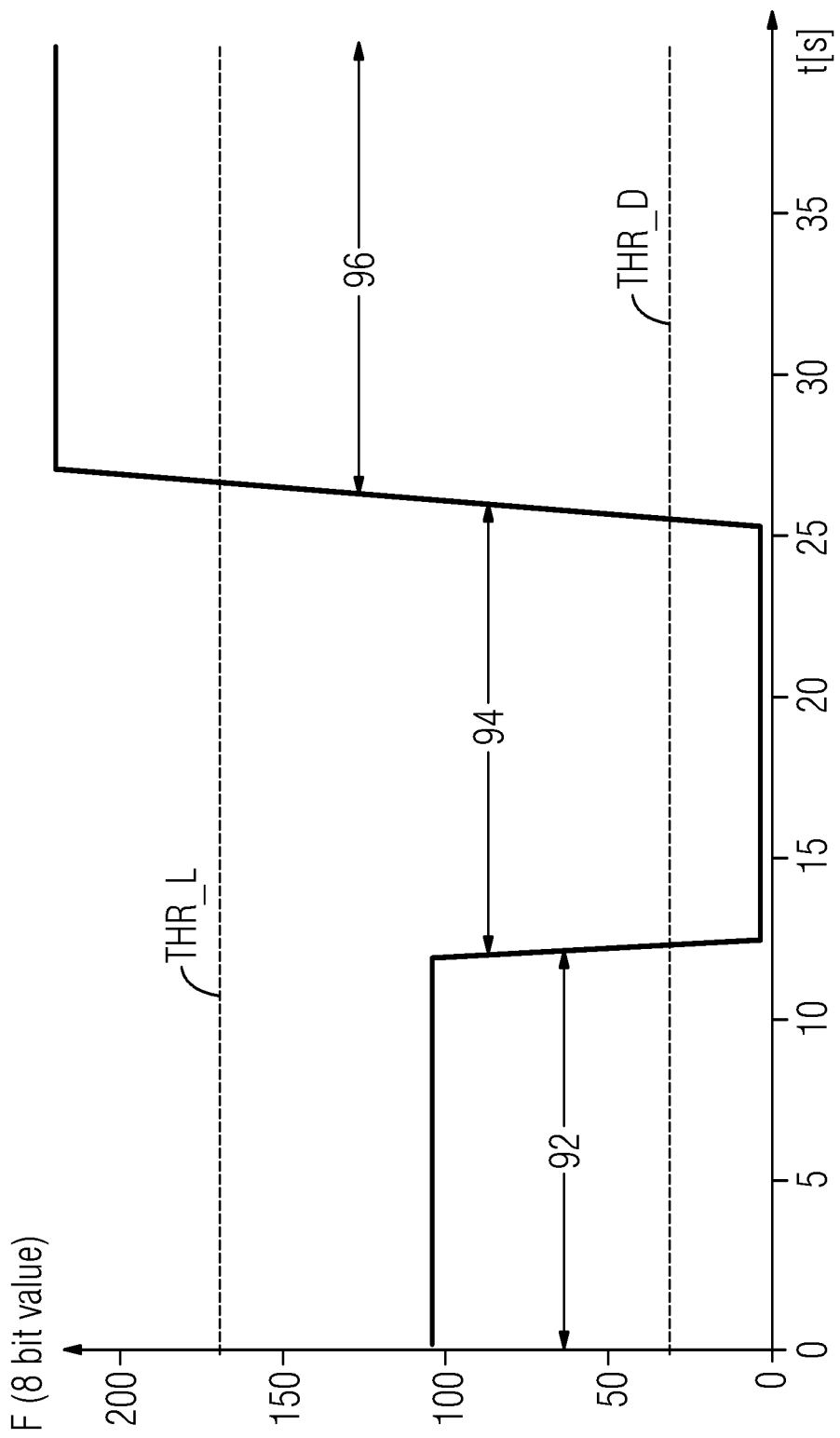

The present invention will be described in further detail with reference to the drawing, in which FIG. 1 illustrates a schematic block diagram of an apparatus for controlling and detecting the functions of a plurality of fans according to a preferred embodiment of the present invention, FIG. 2 illustrates a schematic block diagram of a system for controlling and detecting the functions of a plurality of fans according to the preferred embodiment of the present invention, FIG. 3 illustrates a schematic flow chart diagram of an algorithm for detecting the functions of a plurality of fans according to the preferred embodiment of the present invention, FIG. 4 illustrates a schematic flow chart diagram of a multiple-fan checking routine according to the preferred embodiment of the present invention, and FIG. 5 illustrates a schematic diagram of a fan monitoring signal as function of the time t during the multiple-fan checking routine according to the preferred embodiment of the present invention.

FIG. 1 illustrates a schematic block diagram of an apparatus for controlling and detecting the functions of a plurality of fans 12, 14 and 16 according to a preferred embodiment of the present invention. The apparatus includes a control unit 10, a driver and sensing device 20, a first fan driver 22, a second fan driver 24 and an Nth fan driver 26. The apparatus may be adapted for controlling and detecting the functions of two up to N fans 12, 14 and 16. The apparatus is connected to the fans 12, 14 and 16.

The first fan driver 22 is connected via a unidirectional line to a first fan 12. In a similar way, the second fan driver 24 is connected via a unidirectional line to a second fan 14. Moreover, an Nth fan driver 26 is connected via a unidirectional line to an Nth fan 16. The control unit 10 is connected to the N fan drivers 22, 24 and 26 via separate unidirectional lines. Further, the control unit 10 is connected to the driver and sensing device 20 via a unidirectional line. Contrary, the driver and sensing device 20 is connected to the control unit 10 via another unidirectional line. At last, the driver and sensing device 20 is connected to the N fan drivers 22, 24 and 26 via a common unidirectional line.

A first pulse-width modulation signal 32 is sent from the control unit 10 to the first fan driver 22. In a similar way, a second pulse-width modulation signal 34 is sent from the control unit 10 to the second fan driver 24. Moreover, an Nth pulse-width modulation signal is sent from the control unit 10 to the Nth fan driver 26. A fan enabling signal 28 is sent from the control unit 10 to the driver and sensing device 20. Further, said fan enabling signal 28 is sent from the driver and sensing device 20 to the fan drivers 22, 24 and 26. A fan monitoring signal 30 is sent from the driver and sensing device 20 to the control unit 10.

FIG. 2 illustrates a schematic block diagram of a system for controlling and detecting the functions of the plurality of fans 12, 14 and 16 according to the preferred embodiment of the present invention. The system comprises an input-output device 38, a fan speed monitoring device 40 and a sensing and control system 42. The sensing and control system 42 includes an analogue-digital converter system 44 and a fan control system 46. In this example, the input-output device 38 is realized by hardware, while the sensing and control system 42 is realized by software. The analogue-digital converter system 44 includes an analogue-digital converter 48 and averaging means 50. The fan control system 46 includes a fan control unit 52 and a look-up table 54.

An analogue signal 56 is sent from the input-output device 38 to the analogue-digital converter 48. The analogue signal 56 corresponds with the speed of the fan 12, 14 or 16. The analogue-digital converter 48 samples and converts the analogue signal 56 into a sampled digital signal 58. The averaging means 50 averages the sampled digital signals 58 and generates a fan monitoring signal 60. The fan monitoring signal 60 is sent from the averaging means 50 of the analogue-digital converter system 44 to the fan control unit 52 of the fan control system 46.

The fan control unit 52 generates the pulse-width modulation signals 32, 34 and 36 and the fan enabling signal 28 on the basis of the fan monitoring signal 60 from the averaging means 50 and one or more threshold values 64 provided by the look-up table 54.

The fan speed monitoring device 40 may send a speed request 62 to the fan control unit 52, so that the current speed of the fans 12, 14 and 16 is indicated by said fan speed monitoring device 40.

FIG. 3 illustrates a schematic flow chart diagram of an algorithm for detecting the functions of three fans 12, 14 and 16. The algorithm comprises an initial step 68 and a running mode 70. The running mode 70 includes the states of deactivated fans 72 and activated fans 74. The transition from the states of deactivated fans 72 to the states of activated fans 74 is performed, if the fan speed F_S is bigger than zero. In contrast, the transition from the states of activated fans 74 back to the states of deactivated fans 72 occurs, if the fan speed F_S is zero. Further, the state of activated fans 74 includes a normal operation mode 76, a dynamic fan checking routine 78 and a multiple-fan checking routine 80. In this example, the multiple-fan checking routine 80 is a three-fan checking routine.

When the fans 12, 14 and 16 are activated, then the normal operation mode 76 is obtained. When the number of samples N_S exceeds a threshold value of samples THR_S sufficient for averaging the monitoring signal F, then the dynamic fan checking routine 78 is activated. If the fan monitoring signal F is smaller than a lock threshold value THR_L, then the algorithm changes from the dynamic fan checking routine 78 to the normal operation mode 76 again. However, if the fan monitoring signal F is bigger than the lock threshold value THR_L, then the algorithm changes from the dynamic fan checking routine 78 to the multiple-fan checking routine 80. If a fan timer signal FT exceeds a fourth fan timer threshold value THR3, then the algorithm changes from the multiple-fan checking routine 80 back to the dynamic fan checking routine 78.

There are two ways for entering the three-fan checking routine 80. The first way is a periodic activation of the three-fan checking routine 80, wherein the three-fan checking routine 80 is activated periodically once a fault has been detected. For example, every four minutes a reactivation attempt and a check of all fans 12, 14 and 16 is performed. The second way is a conditional activation of the three-fan checking routine 80, wherein the pulse-width modulation signals 32, 34 and 36 are fixed at 100%. If a fault is detected, then the three-fan checking routine 80 is immediately triggered. During the running mode 70 the three-fan checking routine 80 is possible, if at least one fan 12, 14 or 16 is locked. In this example, the three-fan checking routine 80 requires 41 seconds.

The dynamic fan check routine 78 is called periodically. In this example, the dynamic fan check routine 78 is called every 100 milliseconds. A predetermined number of sampled digital signals 58 from the analogue-digital converter are averaged. In this example, thirty sampled digital signals 58 are averaged, so that every three seconds a dynamic fan lock evaluation is performed.

During the dynamic fan check routine 78 the pulse-width modulation signals 32, 34 and 36 of the fans 12, 14 and 16 are constantly at 100%. There are conditions, in which a locked fan 12, 14 or 16 may be detected. If all fans 12, 14 and 16 are enabled, i.e. no fan 12, 14 or 16 is disabled by the three-fan checking routine 80, then a three-fan threshold value D3_THR is used to detect that at least one of the fans 12, 14 and 16 is locked. If at least one fan 12, 14 and/or 16 is disabled by the three-fan checking routine 80, then a two-fan threshold value D2_THR is used to detect that at least one of the fans 12, 14 and 16 is locked.

FIG. 4 illustrates a schematic flow chart diagram of the multiple-fan checking routine 80 according to the preferred embodiment of the present invention. In this example, the multiple-fan checking routine is the three-fan checking routine 80. The three-fan checking routine 80 comprises an initial step 82, a first fan test 84, a second fan test 86, a third fan test 88 and a final step 90.

In the initial step 82 the initialization of all variables of the algorithm is executed. When the fan timer signal FT exceeds a first fan timer threshold value THR0, then the first fan test 84 is activated. In a similar way, when the fan timer signal FT exceeds a second fan timer threshold value THR1, the second fan test 86 is activated. Moreover, when the fan timer signal FT exceeds a third fan timer threshold value THR2, then the third fan test 88 is activated. At last, when the fan timer signal FT exceeds the fourth fan timer threshold value THR3, the final step 90 is activated.

During the first fan test 84 only the first fan 12 is enabled for a predetermined time. In this example, the first fan 12 is enabled for 13 seconds. Further, the fan speed is set at a predetermined level, in this example at 60%. From the 9th to the 12th seconds the analogue signal 56 is sampled in order to stabilize the speed of the first fan 12.

In a similar way, only the second fan 14 is enabled during the second fan test 86 for 13 seconds and the fan speed is set at 60%. From the 9th to the 12th seconds the analogue signal 56 is sampled in order to stabilize the speed of the second fan 14. In a uniform manner, only the third fan 14 is enabled during the third fan test 88 for 13 seconds and the fan speed is set at 60%. From the 9th to the 12th seconds the analogue signal 56 is sampled in order to stabilize the speed of the third fan 16.

In each fan test 84, 86 and 88, thirty samples of the analogue signal 56 are acquired from the 9th to the 12th seconds and averaged, so that the fan monitoring signal 60 is obtained. Then the fan monitoring signal 60 is compared with the lock threshold value THR_L and a disconnecting threshold value THR_D.

If the fan monitoring signal 60 is above the lock threshold value THR_L, then the activated fan 12, 14 or 16 is locked. If the fan monitoring signal 60 is below the disconnecting threshold value THR_D, then the activated fan 12, 14 or 16 is disconnected.

During the final step 90 the total number of locked and/or disconnected fans 12, 14 and 16 is calculated. Each locked and/or disconnected fan 12, 14 and 16 is disabled until the next activation of the three-fan check routine 80. For example, the next three-fan check routine 80 is activated after four minutes. At last, the final step finishes the three-fan checking routine 80.

FIG. 5 illustrates a schematic diagram of the fan monitoring signal F as function of the time t during the multiple-fan checking routine 80 according to the preferred embodiment of the present invention. In this example, the multiple-fan checking routine is the three-fan checking routine 80.

The fan monitoring signal F is represented as an eight-bit value. The disconnecting threshold value THR_D is 30. The lock threshold value THR_L is 168. During a first phase 92 of about thirteen seconds the fan monitoring signal F has a value of about 100, wherein the fan monitoring signal F is between the disconnecting threshold value THR_D and the lock threshold value THR_L. During a second phase 94 of about further thirteen seconds the fan monitoring signal F has a value of slightly more than zero, wherein the fan monitoring signal F is smaller than the disconnecting threshold value THR_D. During a third phase 96 of about further thirteen seconds the fan monitoring signal F has a value of about 220, wherein the fan monitoring signal F is bigger than the lock threshold value THR_L.

During the first phase 92 the first fan 12 is running normally. The fan monitoring signal F during the second phase 94 indicates that the second fan 14 is disconnected. The fan monitoring signal F during the third phase 96 indicates that the third fan 16 is locked. As result the second fan 14 and the third fan 16 are disabled. The multiple-fan checking routine 80 causes a delay of about 240 seconds.

The algorithm of the present invention has the advantage that the multiple-fan checking routine 80 is not necessary, if during the dynamic fan checking routine 78 the fan monitoring signal F is smaller than the lock threshold value THR_L. In this example, the maximum time for deactivating the locked fan 12, 14 and/or 16 is about 41 seconds. This results in a low heating of the windings of the fan 12, 14 and/or 16. The algorithm of the present invention is suitable for two up to N fans.

Although an illustrative embodiment of the present invention has been described herein with reference to the accompanying drawing, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 control unit
12 first fan
14 second fan
16 Nth fan
20 driver and sensing device
22 first fan driver
24 second fan driver
26 Nth fan driver
28 fan enabling signal
30 fan monitoring signal
32 first pulse-width modulation signal
34 second pulse-width modulation signal
36 Nth pulse-width modulation signal
38 input-output device
40 fan speed monitoring device
42 sensing and control system
44 analogue-digital converter system
46 fan control system
48 analogue-digital converter
50 averaging means
52 fan control unit
54 look-up table
56 analogue signal
58 sampled digital signal
60 fan monitoring signal
62 speed request
64 threshold value
68 initial step
70 running mode
72 state of deactivated fans
74 state of activated fans
76 normal operation mode
78 dynamic fan checking routine
80 multiple-fan checking routine, three-fan checking routine
82 initial step
84 first fan test
86 second fan test
88 third fan test
90 final step 92 first phase
94 second phase
96 third phase
F fan monitoring signal
FT fan timer signal
F_S fan speed
THR0 first fan timer threshold value
THR1 second fan timer threshold value
THR2 third fan timer threshold value
THR3 fourth fan timer threshold value
D2_THR two-fan threshold value
D3_THR three-fan threshold value
N_S number of samples
THR_S threshold value of samples
THR_L lock threshold value
THR_D disconnecting threshold value
t time

The invention claimed is:

1. A method for checking functions of a plurality of fans, said method comprising the following steps:
   starting a normal operation mode,
   detecting or evaluating a common fan monitoring signal depending on speeds of the fans,
   starting a dynamic fan checking routine, in which the common fan monitoring signal is compared with a lock threshold value,
   finishing the dynamic fan checking routine and resuming the normal operation mode when the common fan monitoring signal is smaller than the lock threshold value,
   finishing the dynamic fan checking routine and switching from the dynamic fan checking routine to a multiple-fan checking routine when the common fan monitoring signal is bigger than the lock threshold value, and performing consecutive fan tests corresponding with one single fan in each case during the multiple-fan checking routine, wherein:
   during each consecutive fan test the corresponding fan is activated for a predetermined time period, while the other fans are deactivated during said predetermined time period,
   during each consecutive fan test the common fan monitoring signal is compared with the lock threshold value and a disconnecting threshold value,
   the corresponding fan is locked and an error is detected when the common fan monitoring signal is bigger than the lock threshold value, and
   the corresponding fan is disconnected and an error is detected when the common fan monitoring signal is smaller than the disconnecting threshold value.

2. The method according to claim 1, wherein
the speed of each fan is controlled by a corresponding pulse-width modulation signal, while the fans are enabled and disabled by a common fan enabling signal.

3. The method according to claim 1, wherein
the predetermined time period for each consecutive fan test is between ten and twenty seconds.

4. The method according claim 1, wherein
the common fan monitoring signal is based on an analogue current signal amplitude of the fans, sampled and averaged by an analogue-digital converter system.

5. The method according to claim 4, wherein
samples of the analogue current signal amplitude are taken during the last third of the predetermined time period.

6. The method according to claim 5, wherein
between 20 and 50 samples of the common fan monitoring signal are taken within the last third of the predetermined time period of each consecutive fan test.

7. The method according to claim 2, wherein
the lock threshold value is adapted or adaptable to a number of enabled and disabled fans during the dynamic fan checking routine.

8. The method according to claim 1, wherein
during the dynamic fan checking routine between 20 and 50 samples of the common fan monitoring signal are taken within a time period of between two seconds and five seconds.

9. The method according claim 1, wherein
during the dynamic fan checking routine the speed of the fans is at its maximum value.

10. The method according to claim 1, wherein
during each consecutive fan test the speed of the corresponding fan is between 40% and 80% of its maximum value.

11. The method according to claim 1, wherein
the common fan monitoring signal is represented by a binary coded number.

12. The method according to claim 1, wherein
the multiple-fan checking routine is periodically activated after a predetermined time interval between three and five minutes once an error has been detected, or the multiple-fan checking routine is immediately activated when an error has been detected.

13. An apparatus for controlling and detecting the functions of fans, the apparatus comprising:
   a plurality of fans,
   a plurality of fan drivers, each configured to drive a corresponding fan from the plurality of fans, a controller configured to:
   send a fan enabling signal to at least one fan driver of the plurality of fan drivers to start a normal operation mode for at least one fan of the plurality of fans;
   detect and evaluate a common fan monitoring signal depending on the speeds of the fans;
   start a dynamic fan checking routine, in which the common fan monitoring signal is compared with a lock threshold value;
   finish the dynamic fan checking routine and resume the normal operation mode when the common fan monitoring signal is smaller than the lock threshold value;
   finish the dynamic fan checking routine and switch from the dynamic fan checking routine to a multiple-fan checking routine when the common fan monitoring signal is bigger than the lock threshold value;
   perform consecutive fan tests corresponding with one single fan in each case during the multiple-fan checking routine;
   during each consecutive fan test, activate the corresponding fan for a predetermined time period, while the other fans are deactivated during said predetermined time period;

during each consecutive fan test, compare the common fan monitoring signal with the lock threshold value and a disconnecting threshold value;

lock the corresponding fan and detect an error when the common fan monitoring signal is bigger than the lock threshold value; and disconnect the corresponding fan and detect an error when the common fan monitoring signal is smaller than the disconnecting threshold value.

14. A domestic appliance with a plurality of fans, wherein the domestic appliance comprises the apparatus for controlling and detecting the functions of fans according to claim 13.

15. A non-transitory computer-readable medium having instructions stored thereon that, when executed, cause a computer to perform the method according to claim 1.

* * * * *